Patented Sept. 26, 1939

2,174,454

UNITED STATES PATENT OFFICE 2,174,454

PROCESS FOR REMOVING ENAMEL

Max Zimmermann and Werner Funke, Leverkusen-Wiesdorf, Germany, assignors to I. G. Farbenindustrie Aktiengesellschaft, Frankfort-on-the-Main, Germany No Drawing. Application April 2, 1936, Serial No. 72,412. In Germany April 13, 1935

4 Claims. (Cl. 87—5)

This invention relates to a process for removing the enamel from enameled articles, and to a liquid adapted to remove the enamel.

Hitherto for removing enamel from enameled articles sand-blasts have been in use which, however, do not yield satisfactory results in every case. On the other hand, for removing the enamel acids, such as sulfuric or hydrochloric acid have been employed but also thereby no satisfactory results were obtainable.

In accordance with the present invention enamel can readily be removed from enameled articles by treatment with a mixture of sulfuric and hydrofluoric acid, the acids being preferably employed in equal proportions. A mixture consisting of 20% of hydrofluoric acid and 20% of sulfuric acid and 60% of water has proved to be particularly suitable. The treatment may be effected at normal temperature, preferably at a temperature of 20–30° C. De-enameling in this manner is effected within about 3 to 4 hours if colored enamel is subjected to such treatment, and within about 6 hours if acid resistant and white enamels are treated. After 1 to 2 hours the enamel is already so loose that the greatest part thereof can be mechanically removed by means of a spatula. The use of hydrofluoric acid in the treatment of colored enamel on the average amounts to 1.0 to 1.35 parts of hydrofluoric acid calculated upon 100%, and to 0.2 to 0.5 part of sulfuric acid upon 1 part of enamel. During the process of de-enameling also small quantities of a usual acid inhibitor, such as alpha-naphthonitril, benzonitriles, arylsulfoxides, arylsulfides, thioureas may be added in order to reduce the attack of the mixture of acids upon the metal as far as possible.

The following table shows the advantage of de-enameling by means of a mixture of hydrofluoric acid and sulfuric acid as compared with other acids, acid mixtures respectively.

For de-enameling one part of enamel only
1.9 parts of HF are used,
2.6 parts of HF in a mixture of HF+HCl (1:1)
1.1 parts of HF in a mixture of HF+$H_2SO_4$ (1:1), while $H_2SO_4$ alone is not able to remove the enamel.

When carrying out the process in the above-described manner it is possible to recover the valuable constituents from the enamel sludge, and to use these constituents for preparing a new enamel.

We claim:

1. Process for removing enamel from enameled articles which comprises subjecting the enameled articles to the action of a mixture of hydrofluoric acid, and sulfuric acid said acids being present in about equal proportions.

2. Process for removing enamel from enameled articles which comprises subjecting the enameled articles to the action of a mixture of 20% of hydrofluoric acid, 20% of sulfuric acid and 60% of water.

3. Process for removing enamel from enameled articles which comprises subjecting the enameled articles to the action of an aqueous solution of a mixture of hydrofluoric acid and sulfuric acid at a temperature of 20–30° C. said acids being present in about equal proportions.

4. Process as claimed in claim 1, in which a corrosion inhibitor is added to the mixture of acids.

MAX ZIMMERMANN.
WERNER FUNKE.